(12) United States Patent
Frosberg et al.

(10) Patent No.: US 6,397,452 B1
(45) Date of Patent: Jun. 4, 2002

(54) GUIDE BAR INCLUDING STUMP TREATMENT

(75) Inventors: Karl-Erik Frosberg, Osthammar; Karl-Olov Pettersson, Voxnabruk, both of (SE)

(73) Assignee: Blount, Inc., Portland, OR (US)

( * ) Notice: Subject to any disclaimer, the term of this patent is extended or adjusted under 35 U.S.C. 154(b) by 0 days.

(21) Appl. No.: 09/871,299

(22) Filed: May 30, 2001

(51) Int. Cl.⁷ .................. B21D 39/00; B23D 59/04; A01G 23/08
(52) U.S. Cl. .................. 29/505; 30/123.4; 30/387; 83/169; 83/795; 83/698.11; 144/34.1; 144/364
(58) Field of Search ............... 83/169, 795, 698.11, 83/699.11, 699.21; 30/123.3, 123.4, 383, 387; 144/34.1, 4.1, 364, 380; 76/112; 29/505

(56) References Cited

U.S. PATENT DOCUMENTS

| | | |
|---|---|---|
| 5,050,303 A | 9/1991 | Sinclair |
| 5,056,224 A | 10/1991 | Seigneur |
| 5,143,131 A | 9/1992 | Seigneur |
| 5,426,854 A | 6/1995 | Leini |
| 5,634,273 A | 6/1997 | Michels |
| 5,778,537 A | 7/1998 | Leini |
| 5,797,187 A | 8/1998 | Leini |
| 5,845,402 A | 12/1998 | Leini |

FOREIGN PATENT DOCUMENTS

| | | |
|---|---|---|
| CA | 295454 | 6/1928 |

*Primary Examiner*—W. Donald Bray
(74) *Attorney, Agent, or Firm*—Robert L. Harrington

(57) ABSTRACT

A guide bar for the treatment of tree stumps. A channel formed in the bar length is fitted with a soft metal tube. The tube is pierced with a piercing tool that produces hole forms leaving a center opening inset toward the tube center with flared sides that allow spreading of the liquid treatment directed from the tube interior to a stump surface while severing a tree. The opening may be varied in size to accommodate different pivotal speed rates of the hole form locations along the bar length.

10 Claims, 2 Drawing Sheets

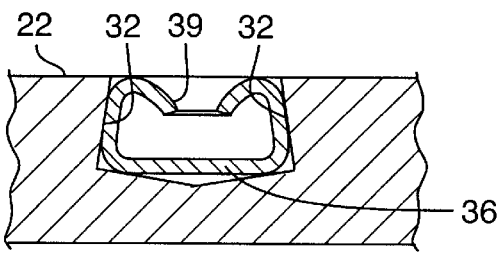
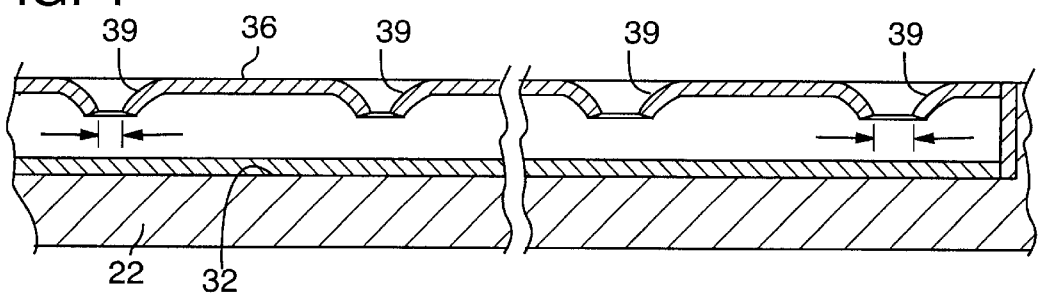
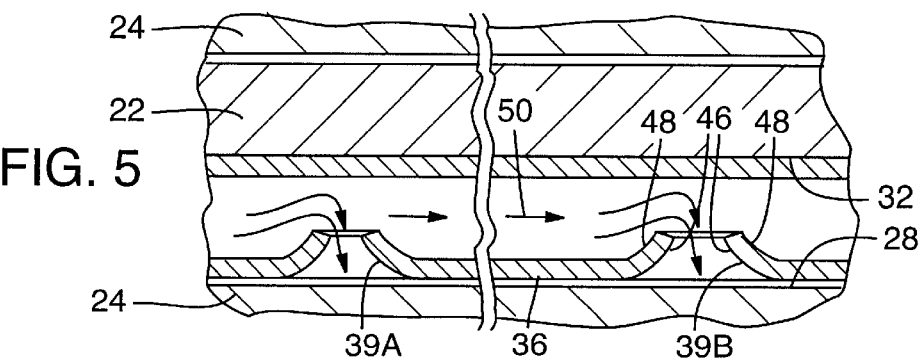
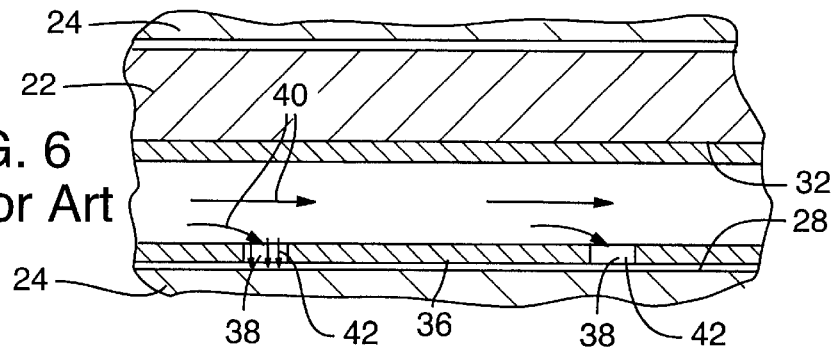
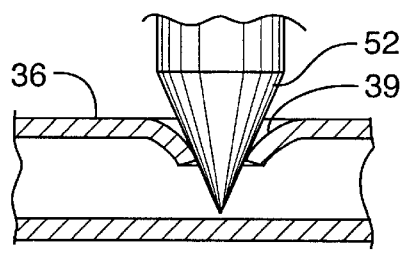

GUIDE BAR INCLUDING STUMP TREATMENT

FIELD OF THE INVENTION

This invention relates to guide bars for chain saws that support and guide saw chain in the cutting of trees and more particularly to such guide bars that simultaneously treat the resultant tree stump with fungicide.

BACKGROUND OF THE INVENTION

When cutting a tree, e.g., with a tree harvester equipped with a chain saw, the resultant tree stump has an exposed surface that is susceptible to fungus growth. The fungus is harmful to forest vegetation and it is accordingly desirable to prevent such growth by the application of a fungicide to the exposed surface of the stump. The procedure commonly used for application of the fungicide is to provide the guide bar for cutting chain with conduit and outlet holes that extend substantially the length of the bar through which a liquid fungicide is flowed under pressure from the guide bar onto the stump. Such procedures are most commonly used by tree harvesters (a tractor-like machine having a maneuverable grapple and chain saw).

A tree harvester typically severs a large tree, e.g., 10–20 inches in diameter in about a second and in that time, the liquid treatment has to be applied over the newly exposed surface of the stump. To achieve the intended result in such a short time span, the fungicide has to be liberally applied under pressure.

There are a number of problems with the procedures currently in use. The cost of the guide bar is significantly increased. The application of the liquid fungicide is messy with much of the fungicide wasted when liberally applied. There is also a concern that the over spraying of the fungicide can itself create an environmental concern. Still further, the procedures that are in use, even with liberal spraying, do not adequately cover the exposed surface of the tree stump.

SUMMARY OF THE INVENTION

The problem with inadequate surface coverage is believed to be caused by several factors. The liquid fungicide is connected into the bar adjacent the rear end of the bar and then directed through a perforated conduit toward the distal end of the bar. The pressure drops as the liquid moves through the conduit and a greater amount of the liquid is forced out of the holes closest to the rear end. The cutting action of the bar is pivotal and the configuration of the tree is circular. Thus, as the bar and chain cut through the tree, the rear end of the bar does the least amount of cutting and traverses the smallest area of the exposed surface of the tree stump and yet, as explained, it receives the greatest flow of the fungicide.

A further factor is that the holes or perforations are necessarily spaced along the bar length and the bar face wherein the conduit resides is close to or in sliding contact with the exposed surface of the tree trunk. Thus the liquid is applied as spaced apart streaks or strips substantially the width of the hole opening leaving intermediate bands of the trunk surface that does not receive the fungicide.

The present invention addresses these factors. In the preferred embodiment, the perforations in the conduit are formed into "hole forms" having a frusto conical shape that is directed inwardly. Thus the wall of the conduit immediately surrounding the opening is inset toward the interior of the conduit and thus spaced further from the surface being treated. This allows the liquid treatment material flowing out of the opening to spread before being deposited on the tree trunk surface. The inset is projected into the linear flow of the material being flowed through the conduit producing turbulence which further aids in the spreading of the fungicide as it exits the openings/perforations. As a further improvement or embodiment, the openings in the conduit may be strategically increased in size back end to distal end which may provide a more even application of the fungicide across the surface of the tree stump.

The conduit as described is preferably provided in a solid bar as differentiated from a laminate bar wherein a sufficiently dimensioned channel can be produced along the length of the bar (on one or both sides). A tube of soft metal is inserted in the channel. The hole forms are produced in the tube by piercing the tube at the desired spacings. The piercing operation (for the soft metal of the tube) is readily accomplished using a needle tool which will indent the tube wall surrounding the opening as well as generate the desired size of opening. Examples of soft metal for the tube are copper, brass and aluminum. Such piercing of soft metal also enables easier provision of different hole sizes along the bar length as may be provided in the further embodiment of the invention.

The invention and the benefits achieved will be more fully appreciated upon reference to the following detailed description having reference to the accompanying drawings.

DESCRIPTION OF THE DRAWINGS

FIG. 3 is a partial and enlarged section view of the conduit of FIG. 2 as taken on view lines 3—3;

FIG. 4 is a sectional view taken on view lines 4—4 of FIG. 1;

FIG. 5 is an enlargement of a portion of the conduit of FIG. 4 illustrating the flow pattern of the fungicide;

FIG. 6 illustrates the flow pattern of a conduit of the prior art; and

FIG. 7 illustrates a hole piercing procedure for producing the hole form configuration of a conduit in accordance with the invention.

DETAILED DESCRIPTION OF A PREFERRED EMBODIMENT

Figure 1:
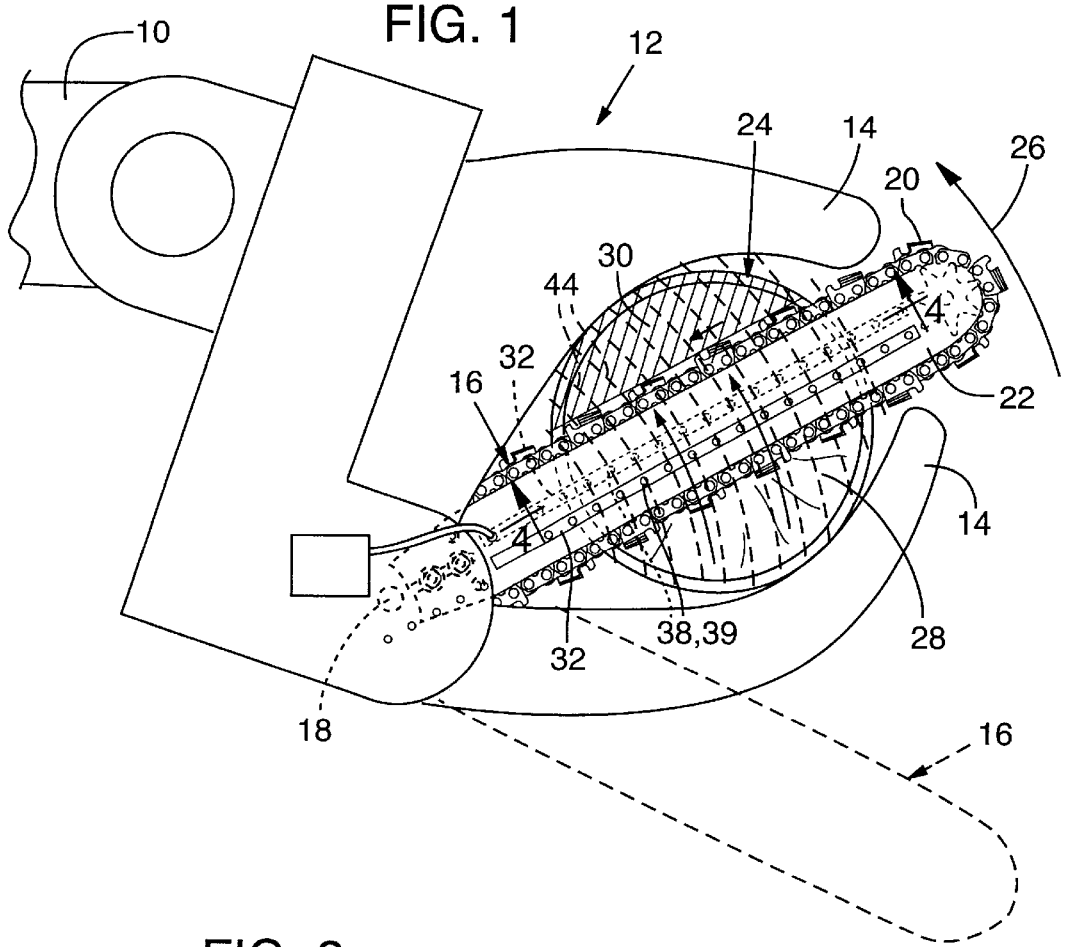
FIG. 1 illustrates a grapple and chain saw of a tree harvester severing a tree while applying liquid fungicide to the tree stump in accordance with the invention.

With reference to FIG. 1, illustrated in part is a boom 10 of a tree harvester having a head portion 12 including grapples 14 and a chain saw including a bar and cutting chain assembly 16 pivotally mounted at pivot 18 on the head portion 12. The assembly 16 includes a cutting chain 20 mounted for driven rotation as indicated by arrows around a guide bar 22.

As typical for tree harvesters, the assembly 16 is retracted behind the corresponding grapple 14 as the grapples of he head portion 12 are maneuvered to encircle and then grip the tree trunk of a tree 24. The grapples 14 are closed to grip the tree above the bar and chain assembly 16 and the bar and chain assembly 16 is then pivoted into and through the tree 24 as indicated by arrow 26. As shown in FIG. 1, the tree is partially severed with the severed portion being indicated by reference 28 and the non-severed portion indicated by reference 20. The grapples 14 assists the cutting operation by preventing the tree from collapsing onto the chain and bar and when the tree is fully severed, the chain and bar assembly 16 is returned to the dash line position and the head portion 12 is maneuvered to lay the severed tree trunk onto the ground for subsequent processing, or alternatively, the tree is first delimbed and cut into desired lengths. The operator of the tree harvester then proceeds to the next standing tree and the process is repeated.

As the chain assembly 16 cuts through the tree 24, the resultant stump portion of the tree has an exposed surface 28. The flat underside of the bar slides along or in close proximity to the surface 28 during the cutting procedure. For treatment of surface 28, a channel 32 is formed between the bar sides and is shown in dash lines in FIG. 1 (FIG. 1 being a view from the upper side of the bar). A conduit (tube) 36 is secured in the channel 32 and the conduit is connected to a supply of liquid treatment or fungicide schematically indicated at reference 34 and having a hose connected to the conduit. Outlet holes or perforations 38 from the conduit and open to the underside of the bar directs the liquid fungicide from the conduit onto the surface 28.

The process as generally described in the preceding paragraph is not new. FIG. 6 is an enlarged segment of a conduit 36 having openings or perforations 38 of the prior art guide bars. It is illustrated as being suspended over an exposed surface 28 of a tree stump. The flow of liquid fungicide through the conduit and through openings 38 is shown by arrows 40. The deposit of the fungicide onto the surface 28 is indicated by arrows 42. Essentially a streak or stripe of the fungicide is applied to the surface 28 substantially corresponding to the width of the opening 38. In order to produce some spreading of the fungicide on the surface 28, the fungicide is pumped through the conduit under high pressure and even then does not adequately cover the surface 28.

Reference is again made to FIG. 1 where dash lines 44 illustrate the travel paths of the holes 38 as the bar traverses the circular area defined by surface 28. Note that the lines 44 near the pivot 18 engages the surface 28 for a short distance but travels relatively slowly as compared to the lines 44 farthest from the pivot 18 which travels faster and covers more surface area. Between the closest and farthest travel paths 44, the travel speed varies proportionately while the travel distance varies as a function of the bar being pivotal and the surface area 28 being circular.

The factors described above produce an inconsistent application of the fungicide on the surface 28. Because the holes 38 are spaced apart and the bar surface is closely adjacent to or in contact with the surface 28, there is little opportunity for the fungicide to spread and what spreading does occur occurs greater at the slower moving holes (which covers the least distance 44 across surface 28) than what occurs at the faster moving holes (which covers the greatest distance 44 of surface 28). This results in an over abundance of the fungicide applied in areas closest to the pivot 18 with much of the fungicide sprayed around and not onto the stump surface. This is considered a potential environmental hazard plus waste of the fungicide plus the mess of having fungicide sprayed onto surrounding equipment that has to be cleaned. All of this is in addition to the fact that much of the surface 28 is not adequately treated with the fungicide.

Reference is now made to FIGS. 4 and 5 which illustrate hole formations or "forms" 39 produced in accordance with the invention. Here the hole form encompasses not only the opening or perforation but also the surrounding area which is inset from the bottom side of the bar and which resembles a frusto cone. Thus the opening itself is spaced farther from the surface 28 and the diverging exterior sides 46 of the hole form 49 allows spreading of the fungicide between the point of exiting the conduit 36 and the application of the fungicide onto the surface 28. Furthermore, the interior wails 48 of the hole form 38 project into the flow of the fungicide traveling through the conduit 36 represented by arrows 50. The turbulence thus created causes the fungicide to exit the openings or hole forms 39 in a diffused pattern to further contribute to the spreading of the fungicide between the holes. The combination of these factors results in the widening of the fungicide streaks to substantially if not fully cover the surface 28.

While the hole sizes can be of equal size, this does not completely accommodate the inconsistency resulting from the difference in the speed of travel of the hole form locations, i.e., the hole forms closer to the pivot point 18 traveling a slower speed than those hole forms further from the pivot 18. FIG. 5 illustrates two hole forms 39, the hole form indicated as 39A representing a hole form closer to the pivot 18 and 39B representing a hole form further from the pivot 18.

The hole form 39A has a smaller opening than the opening of hole form 39B. Thus the liquid fungicide will more freely flow through the opening of hole form 39B to offset the slower movement of hole form 39A. Whereas only two hole forms 39 are shown, it will be understood that the sequential hole forms 39 have gradually increasing openings from the nearest to the farthest of the hole forms 39. However, the user of the invented guide bar may find benefit in further differential and arrangement of the opening sizes.

Figure 2:
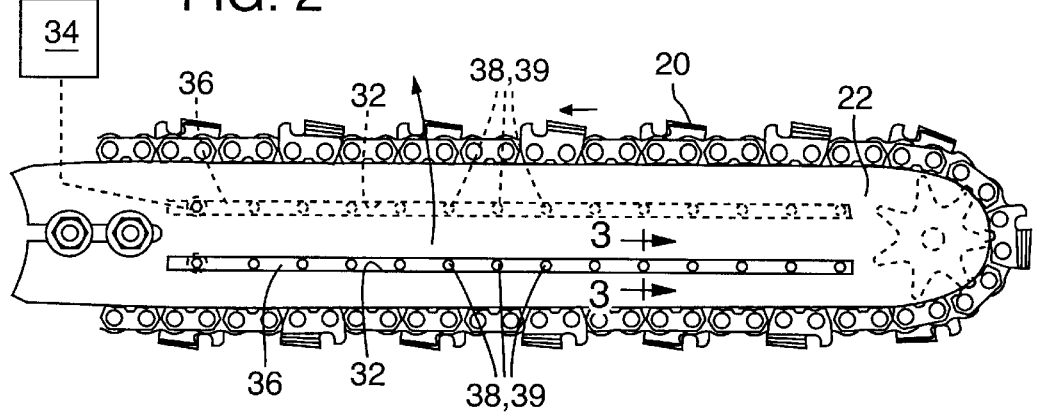
FIG. 2 illustrates the bar only of the chain saw of FIG. 1 with the fungicide applying conduit of the invention shown in greater detail.

Whereas the above provides a solution to the problems of fungicide deposit onto the exposed surface 28 of the tree trunk, the production of a guide bar having the features described is potentially cost prohibitive. This problem has also been addressed. FIGS. 2 and 3 represent a solid steel bar 22 in which a channel 32 is formed. A conduit 36 in the form of an elongate tube is laid in the channel 36 and secured therein by a known process disclosed is U.S. Ser. No. 09/698,069. The tube is made of a soft material such as copper, brass and/or aluminum. The holes are formed in the tube by a needle tool 52 illustrated in FIG. 7. The holes produced in this manner readily produce the hole form 39 of FIG. 3 in a cost efficient manner. Such will be readily apparent to those skilled in the art upon reviewing the disclosure herein.

The above descriptions are directed to preferred embodiments only and those skilled in the art will conceive of numerous variations and modifications without departing from the invention as defined in the claims which follow. As for example the holes, instead of or in addition to having different sizes, can have different spacings one from the other, e.g., the holes nearer the distal end being spaced closer together than the holes near the rear of the bar. Accordingly the invention is not limited to the above-disclosed embodiments but is intended to encompass the invention as broadly defined in the claims appended hereto.

The invention claimed is:

1. A guide bar for a chain saw for cutting down trees comprising:
   an elongate guide bar having a channel formed along its length;
   an elongate tube defining an exterior wall and interior cavity, said tube secured in the channel, said tube having a side wall portion exposed to the exterior of the guide bar at one side of the guide bar;

said tube having hole forms provided along its length in said exposed side wall portion, said hole forms defining an inset from the exterior wall and extended into the interior cavity with a center opening and diverging sides extending outward from said center opening to the exterior wall of the tube; and a liquid treatment source connected to said interior cavity for directing liquid treatment into and through said cavity and out of said openings and onto an exposed surface of a tree trunk.

2. A guide bar as defined in claim 1 wherein said hole forms along the length of said tube have varying opening sizes to provide differing flow rates among the openings therein.

3. A guide bar as defined in claim 1 wherein said hole form locations along the length of said tube have different spacings between the hole forms.

4. A guide bar as defined in claim 2 wherein said guide bar is pivotally mountable at a rear end and extended to a distal end, said openings in said hole forms varying in opening sizes from smaller openings to larger openings from said rear end to said distal end.

5. A guide bar as defined in claim 1 wherein said interior cavity defines a linear flow cavity directing the flow of said liquid treatment, said hole forms projected inwardly into said linear flow cavity to cause turbulence in the flow of liquid treatment and accordingly divergence of the liquid flow when exited through said openings.

6. A guide bar as defined in claim 1 wherein said elongate tube is a soft metal with the hole forms produced by simultaneously piercing said exposed wall and insetting a portion of the exposed wall surrounding said opening.

7. A guide bar as defined in claim 1 wherein a channel is provided on both sides of the guide bar and tubes are provided in both channels to permit inversion of said guide bar on said tree harvester.

8. A process of producing a guide bar for treatment of tree stumps that comprises:

providing a solid steel elongate guide bar to be used for guiding a saw chain, the assembly of bar and saw chain mountable on a tree harvester for cutting down trees and in the process leaving a tree stump having an exposed surface susceptible to fungus growth;

forming an elongate channel in a side of said guide bar, said side superimposed over said exposed surface during the cutting of said trees;

providing a tube sized to fit said channel and securing said tube in said channel so as to have a side wall portion exposed to the exterior of said side of said guide bar;

pierce forming a plurality of hole forms in said tube in said side wall portion arranged in spaced apart relation along the length of said tube, said pierce forming producing a wall portion surrounding an opening into the tube inter or and said opening being inwardly of said side wall of said guide bar for increased spacing of the opening relative to the exposed surface of said tree stump; and connecting said tube to a source of liquid treatment material for directing liquid treatment through said tube and through said openings and onto said exposed surface of said tree trunk.

9. A process as defined in claim 8 where in the tube is a soft metal tube and said pierce forming produced by a piercing tool so as to simultaneously inset the side wall portion surrounding said opening to form said hole forms.

10. A process as defined in claim 9 wherein the openings of said hole forms are varied in size from smaller to larger size openings along the bar length.

\* \* \* \* \*